United States Patent
Shin

(10) Patent No.: US 8,607,834 B2
(45) Date of Patent: Dec. 17, 2013

(54) PRODUCTION LAYOUT FOR LCD, METHOD FOR MANUFACTURING THE LCD, AND HARDENING DEVICE FOR THE LCD

(75) Inventor: Jae Ho Shin, Gwangju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/707,330

(22) Filed: Feb. 17, 2010

(65) Prior Publication Data

US 2010/0181023 A1    Jul. 22, 2010

Related U.S. Application Data

(62) Division of application No. 11/203,468, filed on Aug. 12, 2005, now Pat. No. 7,686,913.

(30) Foreign Application Priority Data

Jun. 20, 2005 (KR) .............................. P2005-53127

(51) Int. Cl.
*B32B 37/02* (2006.01)
(52) U.S. Cl.
USPC ...................................................... 156/379.6
(58) Field of Classification Search
USPC .............. 156/379.6, 379.9, 380.9, 381, 497
See application file for complete search history.

(56) References Cited

U.S. PATENT DOCUMENTS

| | | | |
|---|---|---|---|
| 3,347,723 A | | 10/1967 | Hill |
| 3,844,657 A | * | 10/1974 | Schweriner ................. 355/132 |
| 3,852,136 A | | 12/1974 | Plumat et al. |
| 5,419,799 A | * | 5/1995 | Lind et al. ..................... 156/381 |
| 6,100,958 A | | 8/2000 | Teraguchi et al. |
| 6,129,546 A | | 10/2000 | Sada |
| 2002/0105607 A1 | * | 8/2002 | Matsumoto .................... 349/73 |
| 2003/0164681 A1 | | 9/2003 | Fukuoka et al. |
| 2003/0178467 A1 | * | 9/2003 | Lee et al. ....................... 228/42 |
| 2005/0183458 A1 | * | 8/2005 | Ala-Savikota ................. 65/111 |

FOREIGN PATENT DOCUMENTS

| | | |
|---|---|---|
| JP | 09139354 | 5/1997 |
| KR | 2003-0076016 | 9/2003 |
| KR | 10-2004-0071854 | 8/2004 |
| RU | 1792984 | 2/1993 |

OTHER PUBLICATIONS

Office Action issued in corresponding Korean Patent Application No. 10-2005-0053127; issued Apr. 17, 2009.

* cited by examiner

*Primary Examiner* — Daniel McNally
(74) *Attorney, Agent, or Firm* — Brinks Gilson Lione

(57) ABSTRACT

A production layout for an LCD is provided. The production layout for an LCD includes a bonding part operable to bond a pair of substrates for the LCD with a sealant and a hardening part operable to harden the sealant. The hardening part includes an ion provider operable to supply ions to the substrates during a hardening process of the sealant. The production layout further includes a transfer unit that loads and unloads the bonded substrates. Footprint and tact time for manufacturing the LCD may be reduced. Electrostatic removal effect of the bonded substrates may improve.

6 Claims, 4 Drawing Sheets

PRODUCTION LAYOUT FOR LCD, METHOD FOR MANUFACTURING THE LCD, AND HARDENING DEVICE FOR THE LCD

The present patent document is a divisional of U.S. patent application Ser. No. 11/203,468, filed Aug. 12, 2005, which claims priority to Korean Patent Application No. P2005-53127 filed in Korea on Jun. 20, 2005, which is hereby incorporated by reference.

BACKGROUND

1. Field of the Invention

The invention relates to a liquid crystal display (LCD), and more particularly, to a production layout for an LCD.

2. Discussion of the Related Art

LCD devices are widely used as mobile displays for notebook computer monitors. The LCD devices are also under development for televisions (TVs) for receiving and displaying broadcasting signals.

An LCD device is provided with a liquid crystal display panel for displaying a picture and a driving part for providing a driving signal to the liquid crystal display panel. The liquid crystal display panel has two glass substrates bonded together with a gap between the substrates, and a liquid crystal is injected between the two glass substrates.

The LCD device is manufactured by performing a bonding process and a hardening process in sequence. The bonding process is to bond a color filter substrate and a thin film transistor (TFT) substrate together to make a predetermined cell region after depositing a sealant and dropping a liquid crystal. The hardening process is to harden the sealant after performing the bonding process and includes an ultraviolet (UV) hardening process and a thermal hardening process. In the UV hardening process, the sealant is primarily hardened using irradiation of light after the bonded substrates are fed on a production layout. In the thermal hardening process, both the sealant and liquid crystal are hardened using heat of high temperature.

The bonding process is performed in vacuum. Because the substrates are bonded together in a state that they are adsorbed in a chuck by static electricity, much static electricity remains in the substrates after the bonding process. The static electricity may increase a defect ratio. Therefore, a separate electrostatic removal process may be required prior to the thermal hardening process following the UV hardening process.

When an additional space for the electrostatic removal process is required, the length of an overall production layout, i.e., footprint is increased and tact time is also increased.

Further, the electrostatic removal process is performed for a short time, approximately, ten minutes or less. This may minimize increase of tact time required to manufacture the LCD. However, electrostatic removal of the substrates may not be sufficiently performed. For this reason, a defect caused by the static electricity may be present. Accordingly, there is a need of an LCD device that substantially obviates drawbacks of the related art.

BRIEF SUMMARY

By way of introduction only, in one embodiment, a production layout for a liquid crystal display (LCD) includes a bonding part operable to bond a pair of substrates for the LCD with a sealant and a hardening part operable to harden the sealant. The hardening part includes an ion provider operable to supply ions to the bonded substrates during a hardening process of the sealant. The production layout further includes a transfer unit loading and unloading the bonded substrates.

In other embodiment, a hardening device for an LCD includes a chamber part configured to receive a plurality of substrates therein; a heat generating part operable to generate heat to harden the substrates; a blowing part circulating air and the heat into the chamber part; and an ion provider providing ions to the substrates in the chamber part.

In another embodiment, a method for manufacturing an LCD includes bonding a pair of substrates for the LCD and hardening a sealant bonding the pair of substrates. Ions are supplied to the bonded substrates while the hardening occurs.

It is to be understood that both the foregoing general description and the following detailed description of preferred embodiments are exemplary and explanatory and are intended to provide further explanation of the invention as claimed.

BRIEF DESCRIPTION OF THE DRAWINGS

The accompanying drawings, which are included to provide a further understanding of embodiments and are incorporated in and constitute a part of this application, illustrate the embodiment(s) and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments, examples of which are illustrated in the accompanying drawings. Wherever possible, the same reference numbers will be used throughout the drawings to refer to the same or like parts.

A production layout for an LCD, a method for manufacturing the LCD using the production layout, and a hardening device for the LCD will be described with reference to FIG. 1 to FIG. 4.

Figure 1:
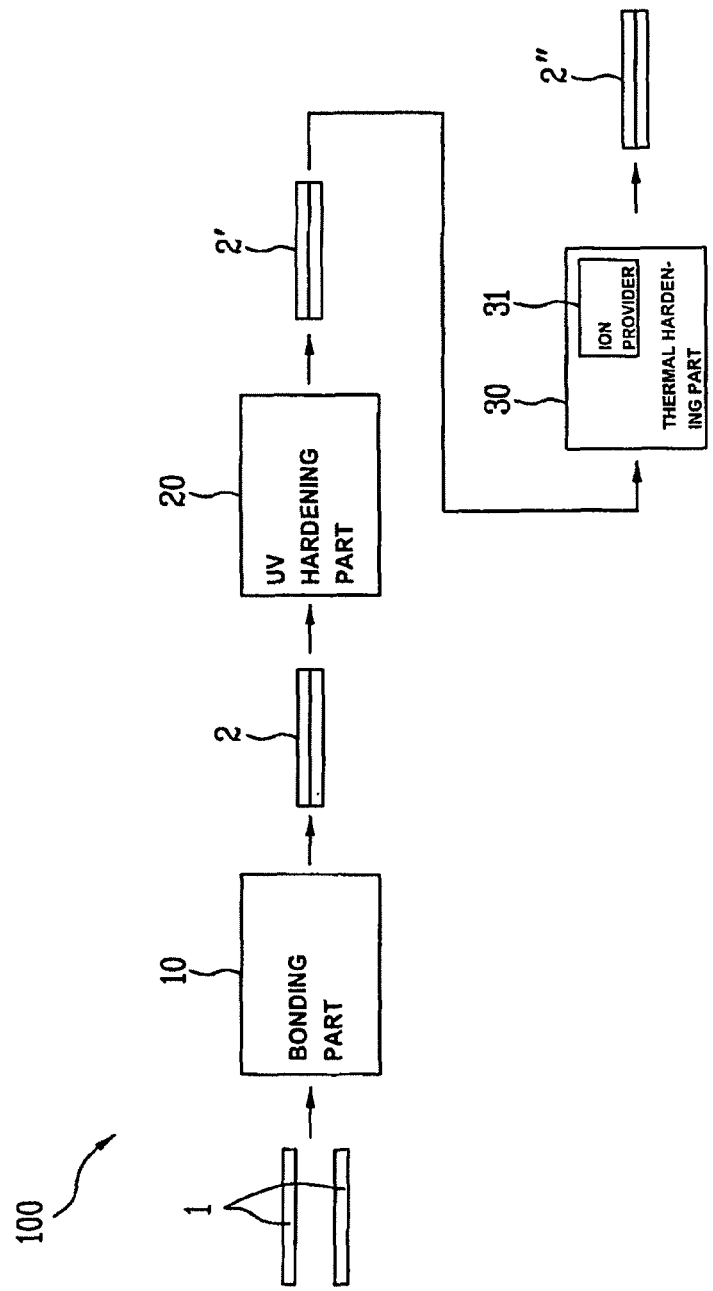
FIG. 1 is a block diagram illustrating a production layout for an LCD.

FIG. 1 illustrates a production layout 100 for an LCD according to one embodiment. The production layout 100 includes a bonding part 10 and a hardening part 20 and 30 which are constructed in sequence. The bonding part 10 serves to bond a pair of substrates 1 for manufacturing the LCD. The hardening part 20 and 30 serves to harden a sealant of bonded substrates 2 and perform an electrostatic removal process. The production layout 100 further includes a transfer unit that loads and unloads substrates 1, 2, 2' and 2" from the bonding part 10 to the hardening part 20 and 30 as shown in FIG. 1.

A UV-hardening sealant is preferably used as the sealant for the LCD. The UV-hardening sealant may be formed of polymer mixed with an initiator. Both ends of the polymer are bonded to an acryl group. Alternatively, or additionally, the UV-hardening sealant may be formed of polymer of which one end is bonded to an acryl group and the other end is bonded to an epoxy group.

In this embodiment, the hardening part includes a UV-hardening part 20 and a thermal hardening part 30 that are separately provided. In other embodiment, the UV-hardening part 20 and the thermal hardening part 30 may be provided in a single body.

The UV-hardening part 20 primarily hardens the sealant of the bonded substrates using UV by loading the substrates 2 bonded by the bonding part 10. It is preferable that the sealant hardened by the UV-hardening part 20 is not completely hardened but partially hardened to the extent that its shape is fixed.

The thermal hardening part 30 includes an ion provider 31 for electrostatic removal. The thermal hardening part 30 thermally hardens the bonded substrates 2 using heat of high temperature. By way of example, the heat is supplied at approximately 100~120° C. The bonded substrates 2, which are hardened by the UV-hardening part 20, are loaded. At the same time, the thermal hardening part 30 performs electrostatic removal of the bonded substrates 2 using ion provided by the ion provider 31. The thermal hardening part 30 entirely hardens the sealant. Substantially simultaneously, a liquid crystal spreads through the bonded substrates 2' and experiences aging.

The production layout 100 is intended to perform electrostatic removal of the substrates 2' while performing the thermal hardening process. Electrostatic removal of the substrates 2' may be sufficiently performed at least because the thermal hardening process is performed for the longest time among processes performed by each device of the production layout 100.

It is desirable that the electrostatic removal process is performed while the thermal hardening process is performed. The ion provider 31 may be provided in either the bonding part 10 or the UV-hardening part 20. Where the ion provider 31 is provided in the bonding part 10 to perform electrostatic removal during the bonding process, substrates 2 adsorbed in a chuck (not shown) are detached from each other by static electricity. For this reason, the electrostatic removal process is required in the bonding part 10 prior to unloading of the substrates 2 and after the bonding process is completed. In this case, since the electrostatic removal process is performed separately from the bonding process, separate time for electrostatic removal may be required.

The hardening time of the UV-hardening part 20 is relatively short and electrostatic removal of the substrates 2 may not be sufficiently performed when the ion provider 31 is provided in the UV-hardening part 20.

Figure 2:
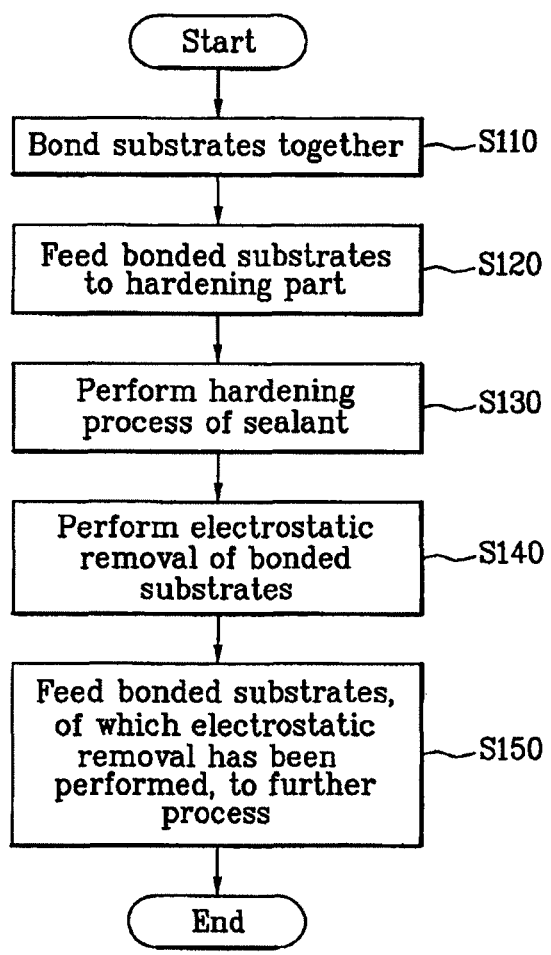
FIG. 2 is a flow chart illustrating a method for manufacturing an LCD.

FIG. 2 is a flowchart illustrating a method for manufacturing an LCD using the production layout 100 of FIG. 1. A pair of substrates 1 for the LCD is bonded together using the bonding part 10 (S110). At this time, since the bonding process between the substrates 1 is performed after the substrates 1 are adsorbed in the chuck using static electricity, much static electricity remains in the bonded substrates 2. The sealant is maintained between the bonded substrates 2 without being hardened.

The bonded substrates 2 unloaded from the bonding part 10 are loaded to the UV-hardening part 20 (S120). At this time, the UV-hardening part 20 irradiates UV light to primarily harden the sealant of the bonded substrates (S130).

Subsequently, the primarily hardened substrates 2 are loaded to the thermal hardening part 30 and thermally hardened using heat of high temperature. Ions are generated by the ion provider 31 while the thermal hardening process is performed by the thermal hardening part 30. The generated ions are provided to the bonded substrates 2' where the thermal hardening process is being performed. Thus, electrostatic removal of the bonded substrates 2' is performed (S140).

Particularly, since the thermal hardening process is performed for a long time, ions are sufficiently provided to the bonded substrates 2'. For example, the thermal hardening part 30 may last 40 minutes or longer. As a result, electrostatic removal of the bonded substrates 2' is more completely performed. The bonded substrates 2" are unloaded after the thermal hardening process and the electrostatic removal are completed. The bonded substrates 2" are fed to a further process (S150).

Figure 3:
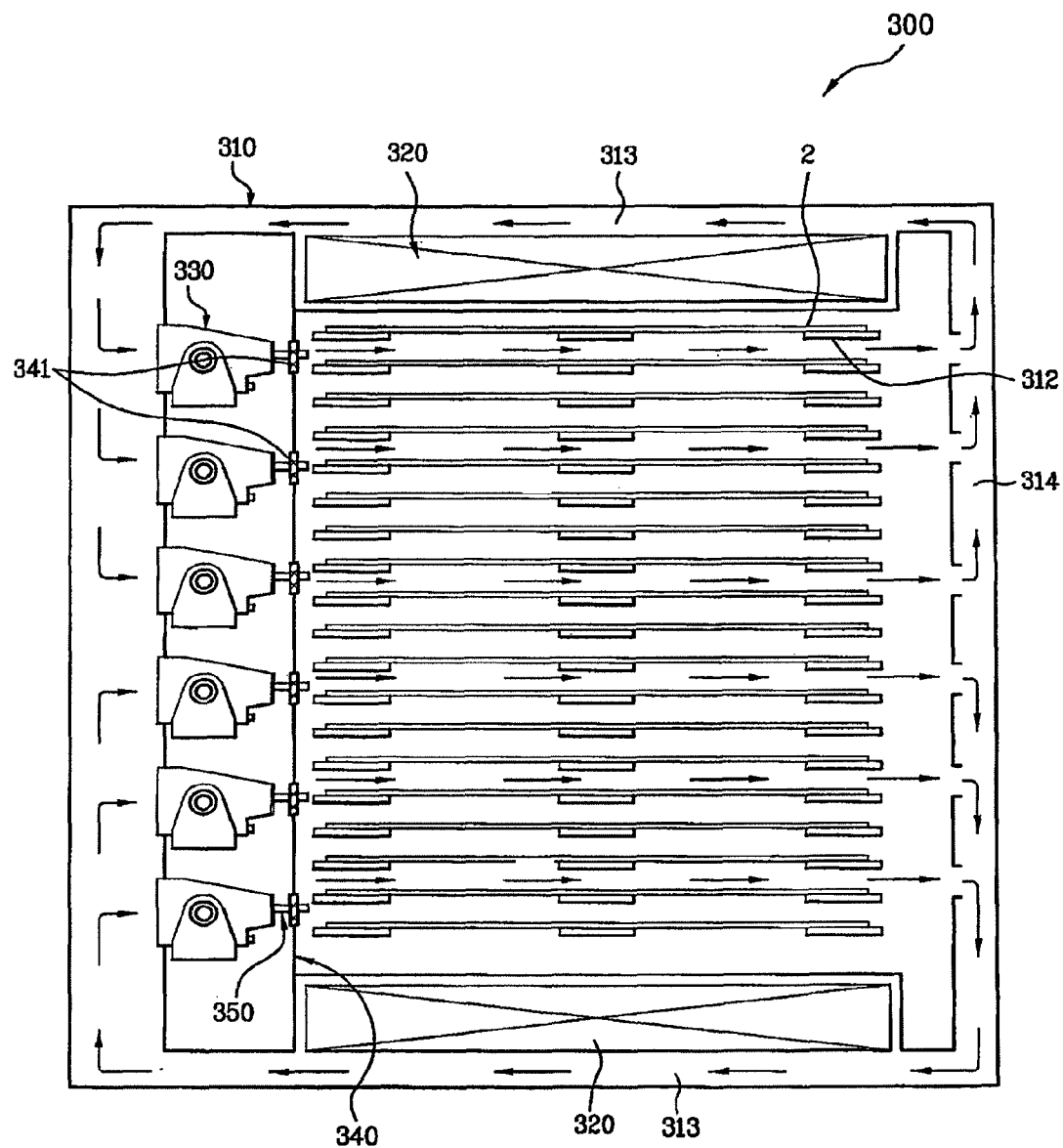
FIG. 3 is a front sectional view illustrating an inner structure of a thermal hardening device for an LCD.
Figure 4:
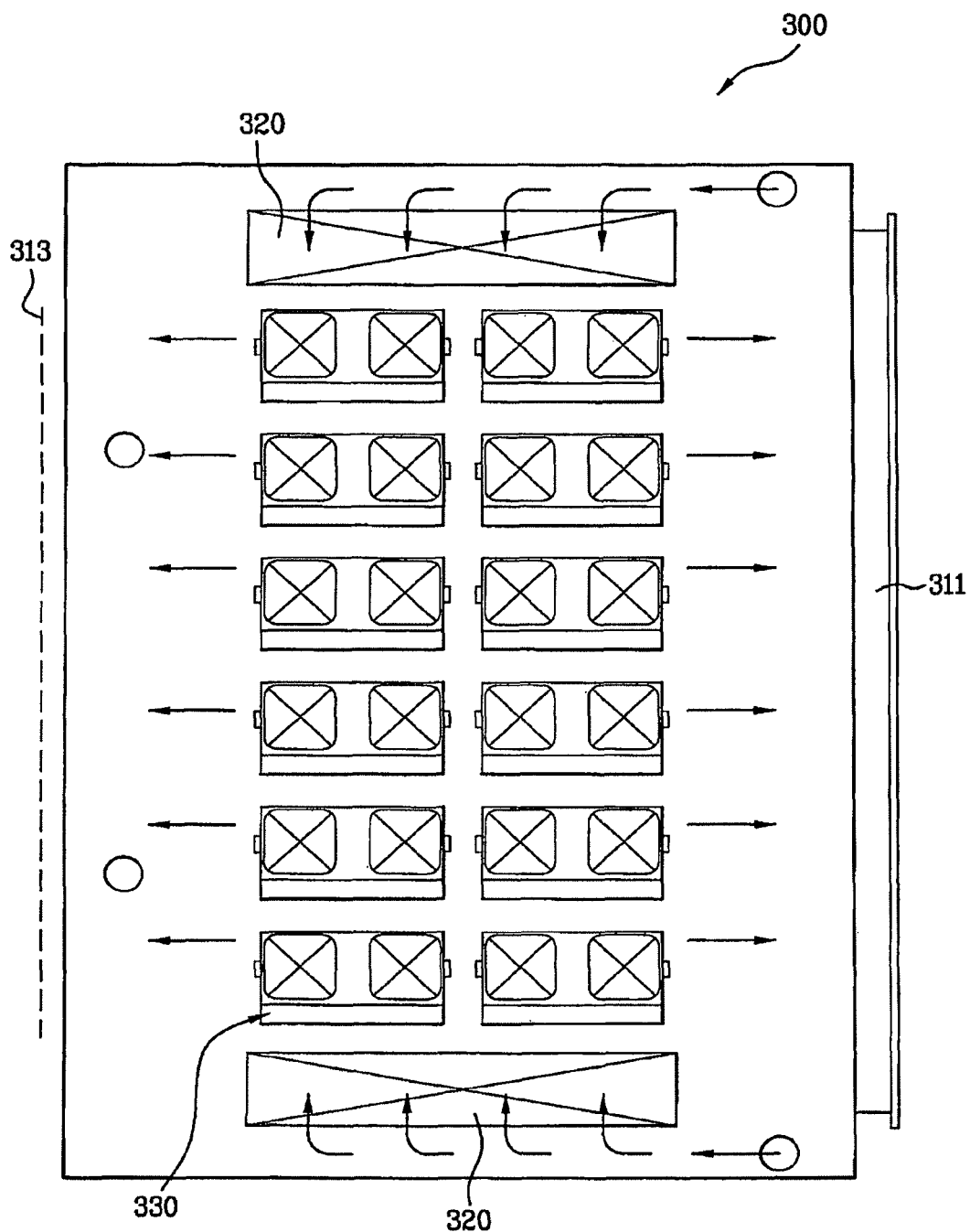
FIG. 4 is a side sectional view illustrating an inner structure of the thermal hardening device for an LCD.

FIG. 3 and FIG. 4 illustrate a thermal hardening device for use with an LCD. The thermal hardening device includes a chamber part 310, a heat generating part 320, a blowing part 330, and an ion provider.

The chamber part 310 includes a predetermined receiving portion that receives a plurality of substrates 2. A door 311 is fixed to the front of the chamber part 310 as shown in FIG. 4, and the receiving portion of the chamber part 310 is provided with multi-staged racks 312 to receive each substrate 2. The rear surface of the chamber part 310 includes an opening so that the substrate 2 may be loaded or unloaded through the opening, and a shutter 313 may preferably be provided on a rear side of the chamber part 310 to open/close the opening.

The chamber part 310 has an inner structure that continuously circulates air blown by the blowing part 330 which will be described below. This inner structure may be obtained by forming a first circulating passage 313 and a second circulating passage 314. The first circulating passage 313 is formed at lower and upper portions of the chamber part 310 and/or both sides of the chamber part 310. The second circulating passage 314 transfers the air blown into the receiving portion of the chamber part 310 to the first circulating passage 313.

The heat generating part 320 generates heat of high temperature to harden the substrates 2 received in the chamber part 310. By way of example, the heat is supplied at approximately 100~120° C. Preferably, the heat generating part 320 is provided inside the lower and upper portions of the chamber part 310. The heat generating part 320 may be provided in at least one of side portions, the lower and upper portions, or central portion. Although not shown, a heat-generating heater may be used as the heat generating part 320. The heat generating part 320 may be constructed in various structures such as a sheath heater, a heat pump structure and a heat pipe structure based on heat conduction.

The heat generating part 320 may be formed separately from the receiving portion in the chamber part 310, as shown in FIG. 3. The heat generated from the heat generating part 320 may not directly affect the bonded substrates 2 in the receiving portion.

The blowing part 330 is provided at one side inside the chamber part 310. It is desirable that a plurality of blowing parts 330 may be longitudinally formed inside the chamber part 310, as shown in FIG. 3.

The blowing part 330 circulates and distributes the air and heat of high temperature into each portion inside the chamber part 310. Heat may be uniformly supplied to the whole portions of the substrates 2 received in each rack 312 of the chamber part 310. The blowing part 330 includes a plurality of blowers configured to be longitudinally arranged along a frame of the chamber part 310.

The blowing part 330 preferably includes a fan and a fan motor (not shown), which may allow the blowing part 330 to be used under the condition of high temperature. The thermal hardening device 300 further includes a partitioning part 340. The partitioning part 340 is formed where a filter part 341 is formed. The partitioning part 340 operates to partition a space inside the chamber part 310 so that air flows through volume of the substrates 2.

An air inlet is formed to be opposite to an air outlet side of the blowing part 330 and it is open. The air flows via the air inlet. The ion provider is constructed to provide ions into the chamber part 310, and includes an ionizer 350 that generates ions by discharging high voltage. In FIG. 3, the ionizer 350 is formed integrally with the air outlet of the blowing part 330. In other embodiment, the ionizer 350 may be separated from the blowing part 330. The filter part 341 operates to filter impurities from the discharged air. The filter part 341 includes a plurality of filters and the ionizer 350 penetrates through the filter part 341. Specifically, the filter part 341 is disposed between the air outlet side of the blowing part 330 and the plurality of substrates 2. A part of the ionizer 350 is disposed between the plurality of substrates 2 and the filter part 341.

Referring to FIGS. 3 and 4, a method for thermally hardening the bonded substrates using the thermal hardening device 300 is described. First, the bonded substrates 2 are received in each rack 312 inside the chamber part 310 by a loading device (not shown). The bonded substrates 2 are loaded through the opening of the chamber part 310 opened by the operation of a shutter 313 shown in FIG. 4. The door 311 is closed when the shutter 313 is closed. The receiving portion inside the chamber part 310 also may be closed from the outside.

After the door 311 is closed, heat of high temperature is provided onto the chamber part 310 as the heat generating part 320 operates. The air is blown into the chamber part 310 as the blowing part 330 works. As a result, heat of high temperature inside the chamber part 310 is circulated inside the chamber part 310.

At this time, the ionizer 350 is discharged by high voltage to generate ions. The ions are provided to the receiving portion inside the chamber part 310 along with the air blown by the blowing part 330. Therefore, the sealant of the bonded substrates 2 received in the chamber part 310 is hardened and the liquid crystal is aged using heat of high temperature. Electrostatic removal of the substrates 2 is performed by the ions substantially simultaneously.

The thermal hardening process is performed for a sufficient time to entirely harden the bonded substrates 2. The ions may be supplied to the bonded substrates 2 for a sufficient period. Therefore, static electricity may be substantially removed from the bonded substrates 2.

The structure of the thermal hardening device is not limited to the thermal hardening device 300 shown in FIGS. 3 and 4. In other embodiment, the ion provider may be provided integrally with the blowing part 330 but provided on a flow path of the air blown by the blowing part 330. Alternatively, or additionally, the flow path of the air may be provided at various positions such as the receiving portion inside the chamber part 310, the first circulating passage 313 and/or the second circulating passage 314.

The blowing part 330 may be integrated with the ion provider to reduce the manufacturing cost and efficiently supply the ions along with the blown air. Various other modifications may be made in the thermal hardening device 300 per occasional demands.

The production layout for the LCD and the method for manufacturing the LCD based on the production layout have the following advantages. Because neither separate devices nor additional time for the electrostatic removal process may be needed, footprint may be minimized and tact time of the overall processes may be reduced. Further, any device for the electrostatic removal process is not required and the initial manufacturing cost may be reduced.

The thermal hardening device for the LCD is constructed to provide the ions in a great quantity to the substrates for a long time while the substrates are thermally hardened. The electrostatic removal of the substrates may be completely performed. Particularly, the ions are provided to the substrates along with the air blown inside the chamber part, and electrostatic removal of the substrates may be performed more efficiently.

It will be apparent to those skilled in the art that various modifications and/or variations may be made without departing from the spirit or scope of the invention. Thus, it is intended that the invention covers the modifications and variations provided they come within the scope of the appended claims and their equivalents.

The invention claimed is:

1. A production layout for a liquid crystal display (LCD) comprising:
   a bonding part operable to bond a pair of substrates for the LCD with a sealant, wherein the sealant is an ultraviolet-hardening sealant;
   a hardening part operable to harden the sealant, the hardening part comprising an ion provider operable to supply ions to the bonded substrates during a hardening process of the sealant; and
   a transfer unit loading and unloading the bonded substrates;
   a receiving portion of a chamber part in a chamber, wherein the receiving portion receives the bonded substrates from the bonding part;
   first and second heat generating parts generating heat;
   a plurality of blowing parts generating air;
   wherein the chamber includes first, second and third circulating passages to circulate the air;
   wherein the first circulating passage transfers the air blown into the receiving portion to the second and third circulating passages;
   wherein the second circulating passage is adjacent to the first heat generating part, and third circulating passage is adjacent to the second heat generating part;
   wherein the first heat generating part is positioned closer to the second circulating passage than the third circulating passage, and the second heat generating part is positioned closer to the third circulating passage than the second circulating passage;
   wherein the second circulating passage supplies the air transferred from the first circulating passage to half of the blowing parts which blow the air into a first portion of the receiving portion through a first filter part filtering the air;
   wherein the third circulating passage supplies the air transferred from the first circulating passage to the other half of the blowing parts which blow the air into a second portion of the receiving portion through a second filter part filtering the air;
   wherein the hardening part comprises an ultraviolet (UV) hardening part performing a UV hardening process and a thermal hardening part performing a thermal hardening process;
   wherein the ultraviolet (UV) hardening part primarily hardens the sealant of the bonded substrates using an ultraviolet during the UV hardening process such that the sealant of the bonded substrates is not completely hardened but partially hardened to the extent that its shape is fixed;
   wherein the thermal hardening part entirely hardens the UV hardened sealant using heat of 100-120° C., and supplies ions to the bonded substrates during the thermal hardening process of the UV hardened sealant;

wherein the ultraviolet (UV) hardening part performs the UV hardening process for A time;
wherein the thermal hardening part performs the thermal hardening process for B time longer than the A time;
wherein the ion provider comprises an ionizer operable to generate ions using high voltage, the ionizer being provided at an air outlet side of the each blowing part;
wherein the first and second filter parts are disposed between the air outlet side of the blowing parts and the plurality of substrates;
wherein the ionizer penetrates through the first and second filter parts;
wherein a part of the ionizer is disposed between the plurality of substrates and the first and second filter parts.

2. The production layout for an LCD according to claim 1, wherein the ion provider is disposed in and integrally formed with the thermal hardening part.

3. A hardening device for an LCD comprising:
a chamber part configured to retain a plurality of substrates bonded with a sealant, wherein the sealant is an ultraviolet-hardening sealant;
an ultraviolet (UV) hardening part that primarily hardens the sealant of the bonded substrates using an ultraviolet during a UV hardening process such that the sealant of the bonded substrates is not completely hardened but partially hardened to the extent that its shape is fixed, wherein the ultraviolet (UV) hardening part performs the UV hardening process for A time;
a thermal hardening part that entirely hardens the UV hardened sealant using heat of 100-120° C., and that supplies ions to the bonded substrates during a thermal hardening process of the UV hardened sealant, wherein the thermal hardening part performs the thermal hardening process for B time longer than the A time;
first and second heat generating parts operable to generate heat to harden the sealant;
a plurality of blowing parts circulating air and heat in the chamber part; and
an ion provider supplying ions to the plurality of substrates in the chamber part;
a receiving portion of the chamber part in a chamber, wherein the receiving portion receives the bonded substrates;
wherein the chamber includes first, second and third circulating passages to circulate the air;
wherein the first circulating passage transfers the air blown into the receiving portion to the second and third circulating passages;
wherein the second circulating passage is adjacent to the first heat generating part, and third circulating passage is adjacent to the second heat generating part;
wherein the first heat generating part is positioned closer to the second circulating passage than the third circulating passage, and the second heat generating part is positioned closer to the third circulating passage than the second circulating passage;
wherein the second circulating passage supplies the air transferred from the first circulating passage to half of the blowing parts which blow the air into a first portion of the receiving portion through a first filter part filtering the air;
wherein the third circulating passage supplies the air transferred from the first circulating passage to the other half of the blowing parts which blow the air into a second portion of the receiving portion through a second filter part filtering the air;
wherein the ion provider comprises an ionizer operable to generate ions using high voltage, the ionizer being provided at an air outlet side of the each blowing part;
wherein the first and second filter parts are disposed between the air outlet side of the blowing parts and the plurality of substrates;
wherein the ionizer penetrates through the first and second filter parts;
wherein a part of the ionizer is disposed between the plurality of substrates and the first and second filter parts.

4. The hardening device for an LCD according to claim 3, wherein the plurality of blowing parts configured to be longitudinally arranged along a frame of the chamber part.

5. The hardening device for an LCD according to claim 4, wherein the air outlet side of the each blowing part is disposed in the chamber part and an air inlet side of the each blowing part is disposed outside of the chamber part.

6. The hardening device for an LCD according to claim 3, wherein the ionizer is integrally formed with the each blowing part.

* * * * *